(12) United States Patent
Marchitello

(10) Patent No.: US 9,862,527 B2
(45) Date of Patent: Jan. 9, 2018

(54) WATER DISPENSING SYSTEM

(71) Applicant: Amanda F. Marchitello, Morrisville, NC (US)

(72) Inventor: Amanda F. Marchitello, Morrisville, NC (US)

( * ) Notice: Subject to any disclaimer, the term of this patent is extended or adjusted under 35 U.S.C. 154(b) by 0 days.

(21) Appl. No.: 15/259,928

(22) Filed: Sep. 8, 2016

(65) Prior Publication Data
US 2017/0066572 A1 Mar. 9, 2017

Related U.S. Application Data

(60) Provisional application No. 62/215,468, filed on Sep. 8, 2015.

(51) Int. Cl.
| | |
|---|---|
| *B65D 47/24* | (2006.01) |
| *B65D 47/02* | (2006.01) |
| *B65D 47/32* | (2006.01) |
| *F16K 31/60* | (2006.01) |
| *F16K 31/524* | (2006.01) |
| *G01F 11/32* | (2006.01) |
| *A47K 5/00* | (2006.01) |
| *A47K 7/00* | (2006.01) |
| *A47K 5/12* | (2006.01) |
| *A47K 10/32* | (2006.01) |

(52) U.S. Cl.
CPC .......... *B65D 47/249* (2013.01); *A47K 5/1208* (2013.01); *B65D 47/02* (2013.01); *B65D 47/32* (2013.01); *F16K 31/52408* (2013.01); *F16K 31/602* (2013.01); *A47K 5/00* (2013.01); *A47K 5/1214* (2013.01); *A47K 7/00* (2013.01); *A47K 2010/326* (2013.01); *B65D 2255/00* (2013.01); *G01F 11/32* (2013.01)

(58) Field of Classification Search
CPC .. A47K 2010/326; A47K 5/00; A47K 5/1208; A47K 5/1214; A47K 7/00; B65D 2255/00; B65D 47/02; B65D 47/249; B65D 47/32; F16K 31/602; F16K 31/52408; G01F 11/32
See application file for complete search history.

(56) References Cited

U.S. PATENT DOCUMENTS

| | | | | |
|---|---|---|---|---|
| 1,844,557 A | * | 2/1932 | Bobrick | A47K 5/1214 222/181.2 |
| 3,540,630 A | * | 11/1970 | Brown | A47K 5/1204 222/153.03 |
| 4,149,573 A | * | 4/1979 | Cassia | A47K 5/1208 141/114 |
| 4,238,056 A | * | 12/1980 | Tucker | A47K 5/1207 222/181.2 |

(Continued)

*Primary Examiner* — Frederick C Nicolas
*Assistant Examiner* — Bob Zadeh
(74) *Attorney, Agent, or Firm* — Crose Law LLC; Bradley D. Crose

(57) ABSTRACT

A device, system, and method for dispensing water to moisten and soften toilet paper tissue, thereby to create an adhesive wipe and to provide a thorough surface cleaning, includes, in at least one embodiment: a water reservoir, a water reservoir locking lid and key, a dispensing actuator, a dispensing port, a wall mount plate, a dispense cup for a predetermined volume of water to use for each metered release of water from the dispenser, and a dispensing valve.

18 Claims, 9 Drawing Sheets

(56) References Cited

U.S. PATENT DOCUMENTS

| | | | | |
|---|---|---|---|---|
| 6,016,936 A | * | 1/2000 | Fan | A47K 5/1204 |
| | | | | 222/181.1 |
| 6,189,740 B1 | * | 2/2001 | Wade | A47K 5/1215 |
| | | | | 222/101 |
| 2017/0066572 A1 | * | 3/2017 | Marchitello | B65D 47/249 |

* cited by examiner

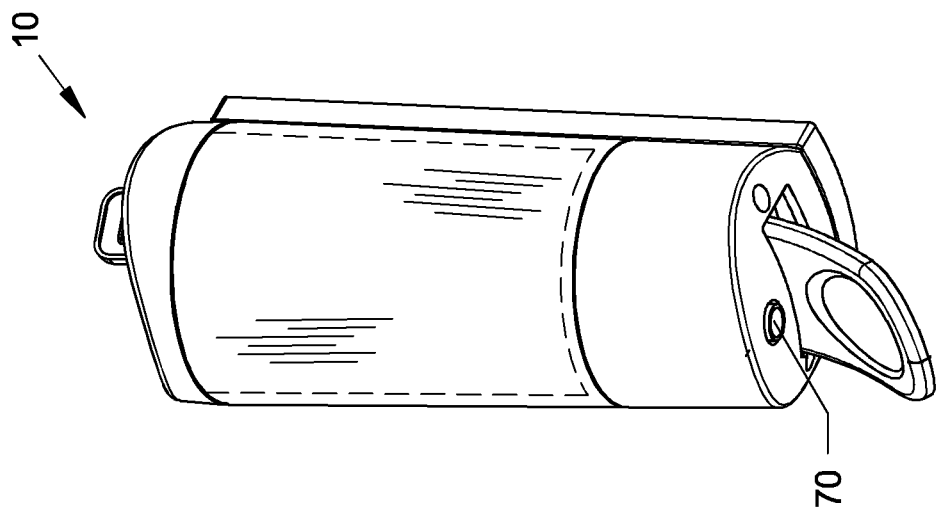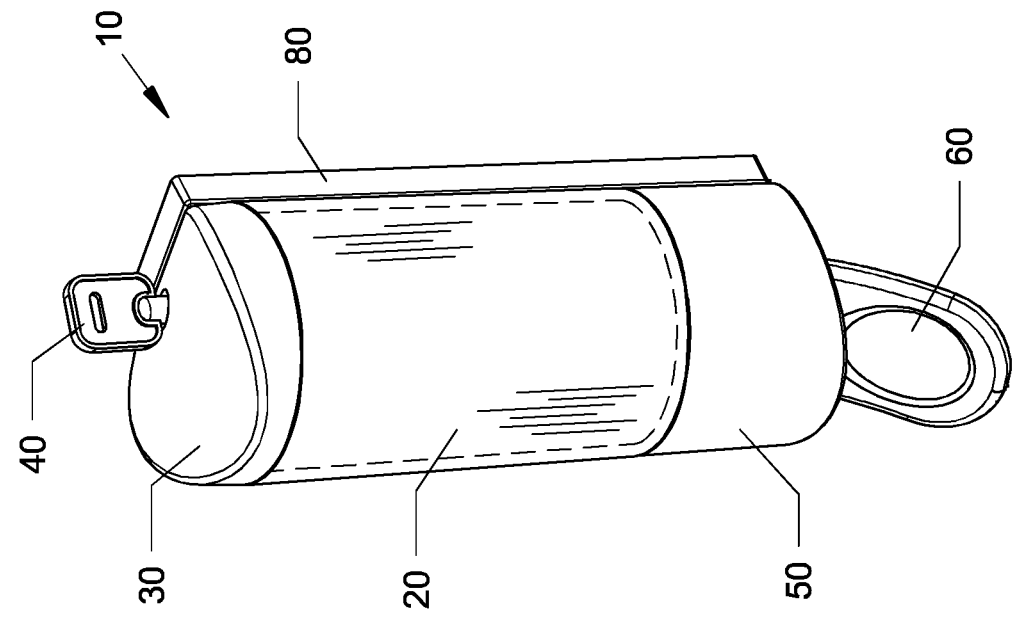

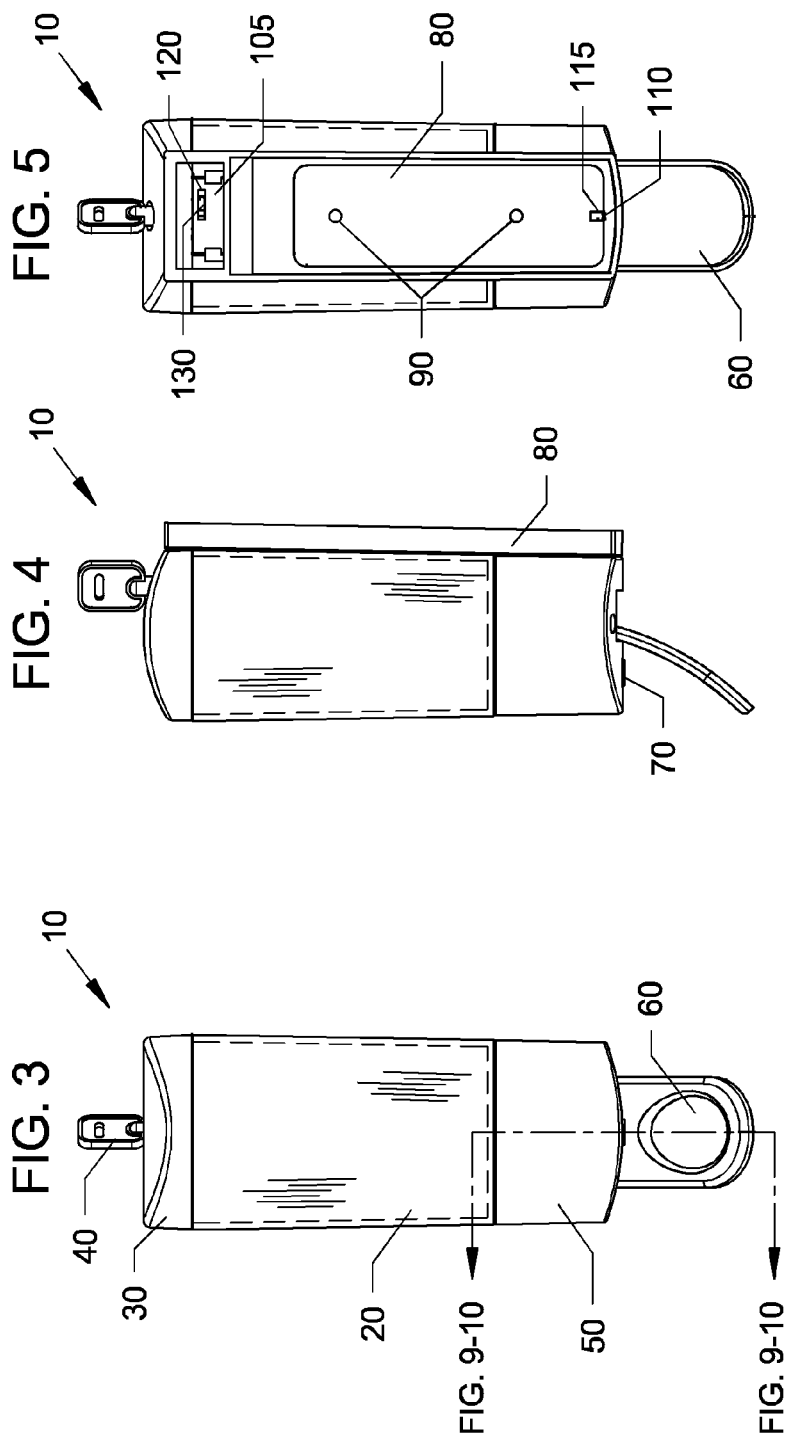

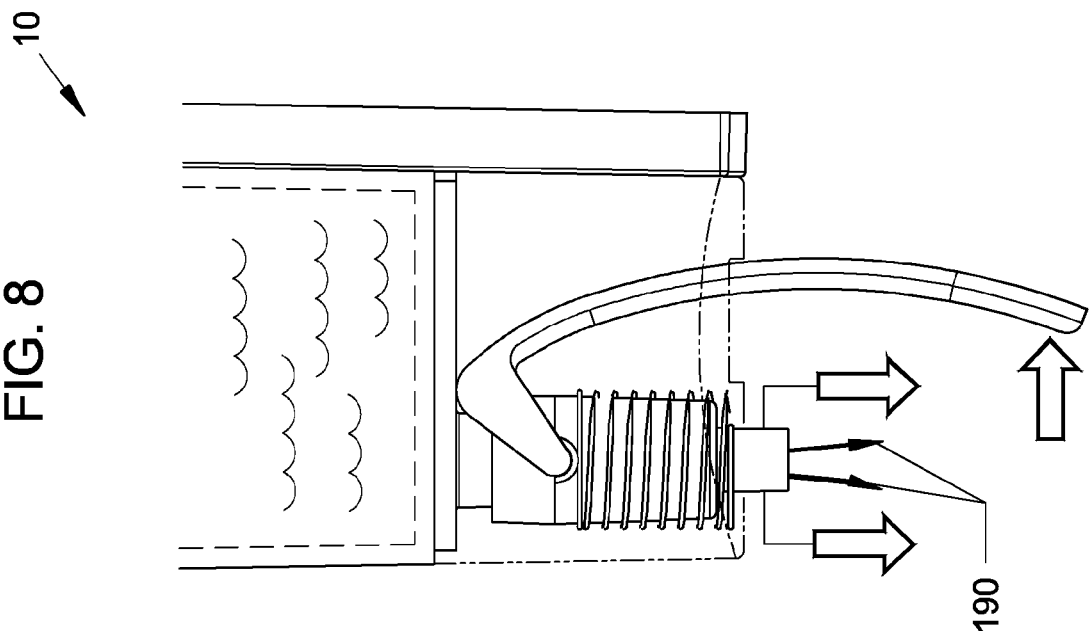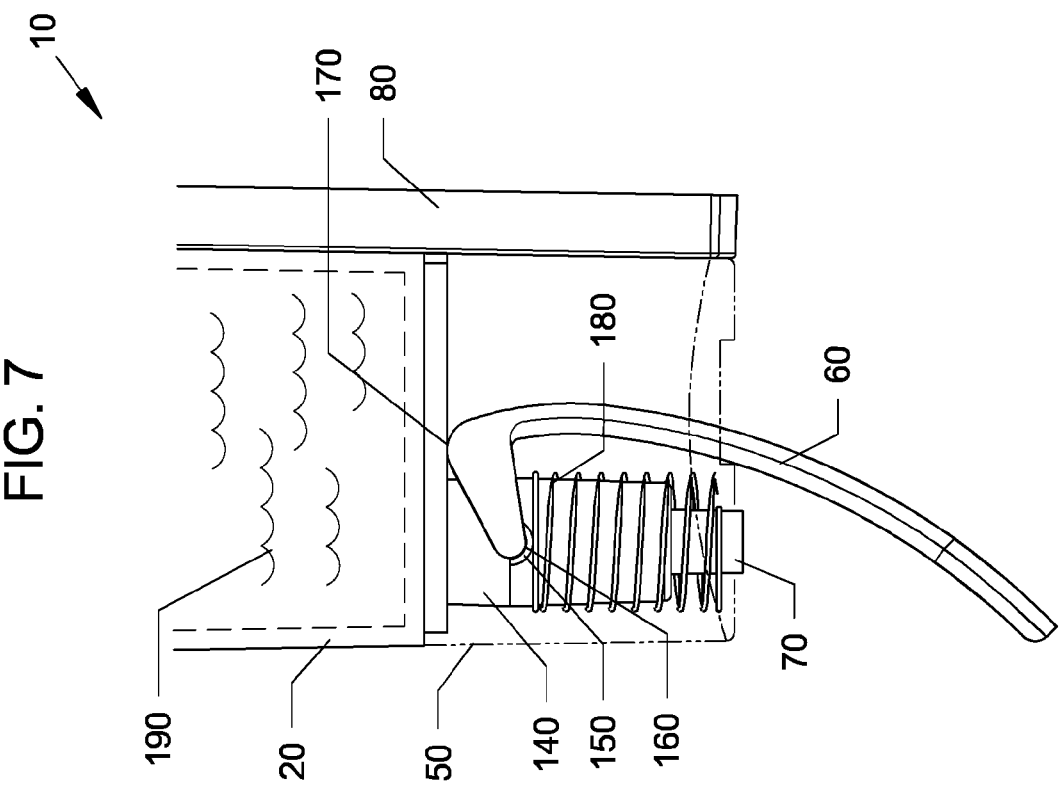

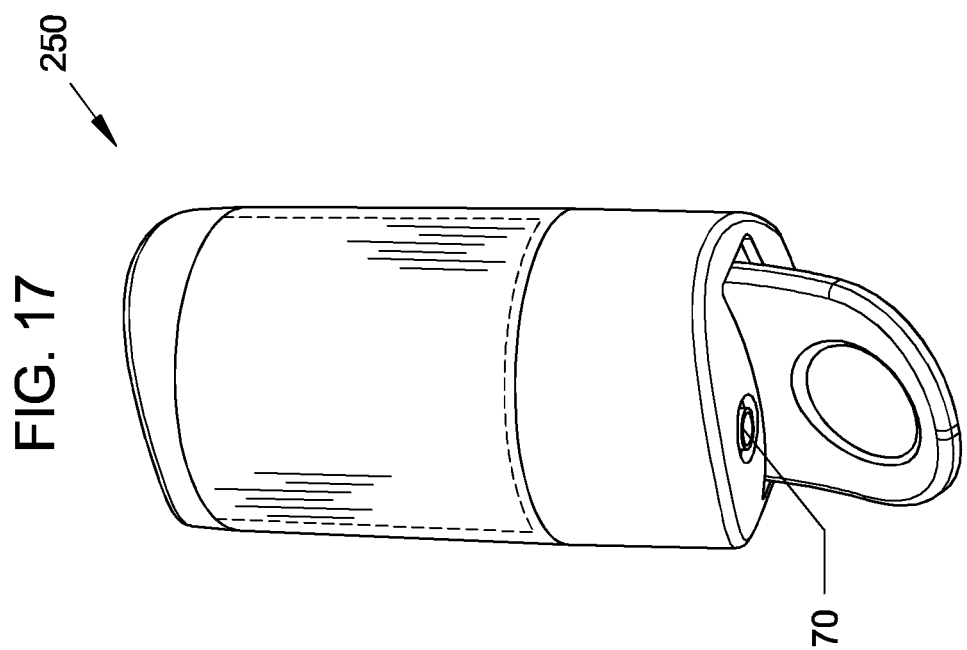
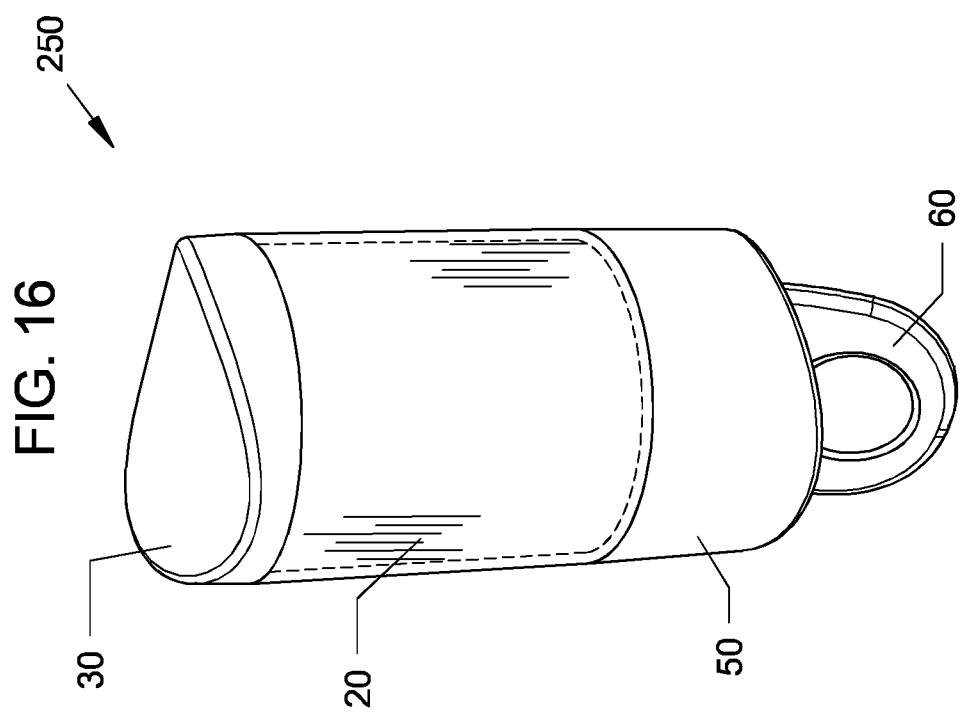

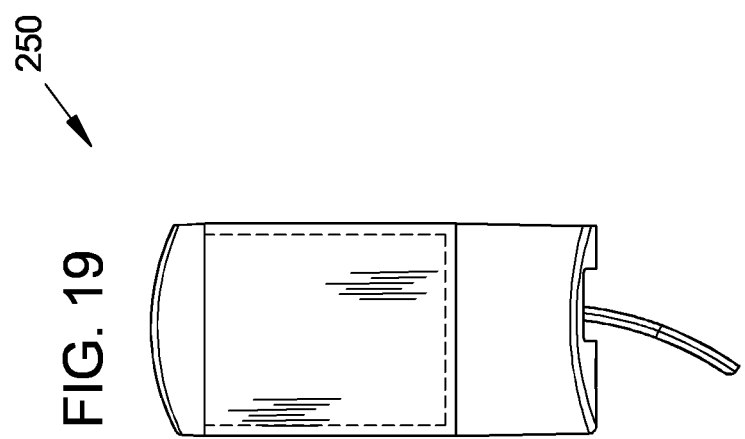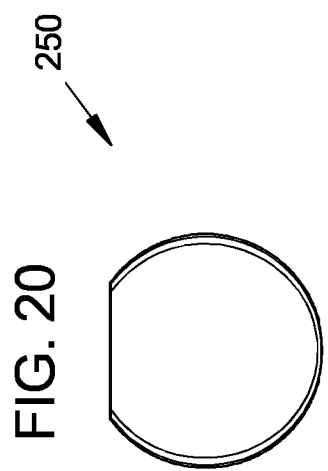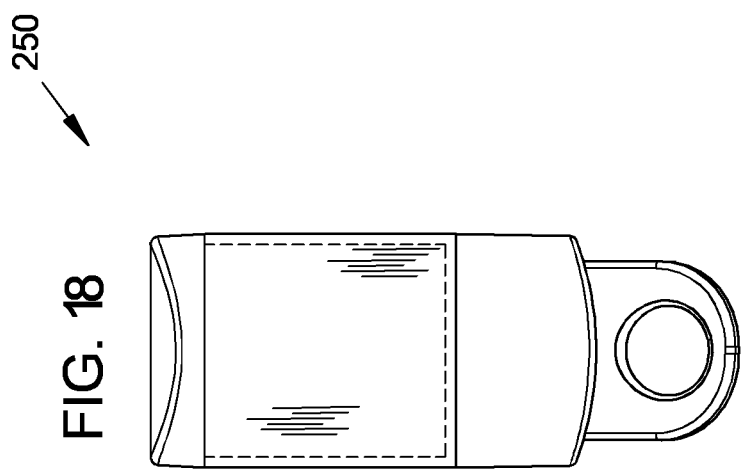

WATER DISPENSING SYSTEM

CROSS-REFERENCE TO RELATED APPLICATION(S)

The present non-provisional patent application claims the benefit of priority of U.S. Provisional Patent Application No. 62/215,468, which is entitled "WATER DISPENSING SYSTEM", which was filed on Sep. 8, 2015, and which is incorporated in full by reference herein.

FIELD OF THE INVENTION

The technology described herein relates generally to devices, systems, and methods for the improvement of personal bathroom hygiene. More specifically, this technology relates to a device, system, and method for dispensing water, other liquids, or combinations of water and another liquid to moisten and soften toilet paper tissue, thereby to create an adhesive wipe and to provide a thorough surface cleaning. Furthermore, the technology described herein relates to a device, system, and method for improved personal hygiene.

BACKGROUND OF THE INVENTION

Personal hygiene products are known in the background art. Such products include bathroom hygiene products such as bidets, sanitary wipes, paper moisteners, cleansing agents, and so forth. There are many shortcomings and deficiencies with known products, systems, and methods.

The foregoing information reflects the state of the art of which the inventor is aware and are tendered with a view toward discharging the inventor's acknowledged duty of candor in disclosing information that may be pertinent to the patentability of the technology described herein. It is respectfully stipulated, however, that the foregoing information does not teach or render obvious, singly or when considered in combination, the inventor's claimed invention.

BRIEF SUMMARY OF THE INVENTION

In various exemplary embodiments, the technology described herein provides a device, system, and method for dispensing water to moisten and soften toilet paper tissue, thereby to create an adhesive wipe and to provide a thorough surface cleaning.

In one exemplary embodiment, the technology described herein provides a metered water wall mounted dispensing system.

The system includes a water reservoir configured to hold water. Water is utilized as the cleansing agent. Water preferably is utilized in the water reservoir as the preferable solution to utilize as it does not introduce other compounds that may produce allergic reactions to a sensitive body area when applied to the user.

In at least one embodiment, the system includes a water reservoir locking lid. The water reservoir locking lid is configured for placement directly upon the top of the water reservoir. The water reservoir locking lid is lockable, such that it can be secured to the water reservoir once it is filled and thereby to prevent any unwanted tampering with the cleansing agent, or water, placed within the water reservoir.

In at least one embodiment, the system includes a locking lid key configured for use with the water reservoir locking lid and to lock the water reservoir locking lid securely to the water reservoir.

In at least one embodiment, the system includes a dispense cup cover. The dispense cup cover is coupled to the bottom side of the water reservoir with pins or the like. Alternative means to couple the dispense cup cover to the bottom side of the water reservoir can be used in alternate embodiments. The dispense cup cover is configured to cover the dispense cup.

In at least one embodiment, the system 10 includes a dispensing actuator. The dispensing actuator is coupled to the underside of the water reservoir, along with other components discussed below, and is configured to be user-operable to dispense water from the system when desired for use and improved personal hygiene.

In at least one embodiment, the system includes a dispensing port. The dispensing port is disposed on the bottom side of the system. The dispensing port is configured to discharge the water, which is a measured, predetermined volume of water, upon the selection by the user and depression of the dispensing actuator. The dispensing actuator is pressing toward the wall surface onto which the system is mounted. Once the water is discharged from the system, the user releases the dispensing actuator to return to its default position.

The system includes a wall mount plate configured to couple the system to a wall surface, such as for example, a wall surface in a bathroom conveniently located for personal hygiene use.

In at least one embodiment, the system includes holes disposed within the wall mount plate for wall mount screws, or like fastening devices.

In at least one embodiment, the dispenser system includes a pair of top mounting hooks. The top mounting hooks are disposed on the back side of the water reservoir. The top mounting hooks are configured to engage a tongue, which is disposed on the wall mounting plate. This coupling provides for a secure attachment of the water reservoir to the wall mounting plate.

In at least one embodiment, the system includes a bottom mounting post. The bottom mounting post is disposed on the metering dispense cup cover. The bottom mounting post is configured to engage a hole in the wall mounting plate. The hole in the wall mounting plate is configured to receive the bottom mounting post to create a secure hold. This coupling provides for a secure attachment of the water reservoir to the wall mounting plate.

In at least one embodiment, the dispenser system includes a lid lock catch. The lid lock catch is disposed on the wall mounting plate and is configured to receive a portion of the rotating lid lock catch.

In at least one embodiment, the system includes a rotating lid lock catch. The rotating lid lock catch is configured to engage the lid lock catch on the wall mounting plate. The rotating lid lock catch includes a projection at one end which enters the lid lock catch upon user rotation of the locking lid key. As such the water reservoir locking lid is locking to the water reservoir.

In at least one embodiment, the dispenser system includes a dispense cup. The dispense cup is disposed immediately below the water reservoir. The dispense cup is configured to hold a predetermined volume of water. In various embodiments, the dispense cup can be varied to change the predetermined volume of water.

In at least one embodiment, the system includes dispense cup posts nests. The dispense actuator posts on the dispensing actuator rest within the dispense cup posts nests.

In at least one embodiment, the system includes dispense actuator posts. The dispense actuator posts are configured to engage the nests in the dispense cup.

In at least one embodiment, the system includes a dispense actuator rocking fulcrum. The dispense actuator rocking fulcrum provides contact points between the actuator and a bottom surface of the water reservoir. The dispense actuator rocking fulcrum is configured to push downwardly via the dispense cup post nests when the actuator is push toward the back of the dispensing system.

In at least one embodiment, the system includes a dispense cup spring. The dispense cup spring is configured to return the dispense cup to a default up position when the dispensing actuator is released. As the dispensing actuator is released, the dispense cup spring returns the dispense cup.

In at least one embodiment, the system includes a dispensing valve. The dispensing valve, when in the cup-up position (fill), is configured to allow the dispense cup to fill with the metered amount of water. While doing so the dispensing valve shuts off the dispenser port. The dispensing valve, when in the cup-down position (dispense), is configured to shut off the water reservoir while allowing the dispense cup to drain.

In at least one embodiment, the system includes a dispensing valve spring. The dispensing valve spring seats the dispensing valve in the water reservoir when the dispense cup is in the dispense position shutting off the water reservoir.

In at least one embodiment, the system includes O-ring seals. The O-ring seals are configured to provide a seal between components of the system. By way of example, O-rings seals are utilized on the dispense valve to provide a seal between the dispense valve and the water reservoir. By way of example, O-rings seals are utilized between the dispense valve and the dispense cup.

In at least one embodiment, the system includes axial air vent grooves. The axial air vent grooves are opened when the dispense cup is in the dispense position to allow air to vent into the dispense cup while water is being dispensing, thereby preventing vapor lock.

In at least one embodiment, the system includes a dispense cup seal. The dispense cup seal is configured to keep fluid in the dispense cup from overflowing during the water fill stage. The dispense cup seal also is configured to open the axial air vent grooves when in the dispense position.

In at least one embodiment, the system includes hex post disposed on the locking lid key. The water reservoir locking lid is configured with a hex cavity. The hex cavity is disposed within the water reservoir locking lid and coupled to the rotating lid lock latch.

In at least one embodiment, the system includes at least one aeration hole disposed upon a top surface of the water reservoir locking lid and thereby configured to allow an airflow ingress and egress with the water reservoir and thereby provide aeration to the water within the water reservoir.

In at least one embodiment, the system includes an aeration screen disposed upon a top surface of the water reservoir locking lid and thereby configured to allow an airflow ingress and egress with the water reservoir and thereby provide aeration to the water within the water reservoir.

Thus, advantageously, the device, system, and methods disclosed provide a dispensing water to moisten and soften toilet paper tissue, thereby to create an adhesive wipe and to provide a thorough surface cleaning. Advantageously, the device, system, and methods disclosed herein do not require a consumer to purchase refills. Advantageously, the device, system, and methods disclosed herein do not require additional solutions, chemicals, and so forth that may cause irritations to a sensitive area of the human body. Advantageously, the device, system, and methods disclosed herein can be operated single-handedly. Advantageously, the device, system, and methods disclosed herein are not cost prohibitive.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 1 is a top perspective view of a metered water wall mounted dispensing system, illustrating, in particular, a water reservoir, dispensing actuator, dispensing cup cover, locking lid, and wall mount, according to an embodiment of the technology described herein;

FIG. 2 is a bottom perspective view of the metered water wall mounted dispensing system depicted in FIG. 1, illustrating, in particular, and in addition to FIG. 1, a dispensing port, and underside view of the dispensing actuator, according to an embodiment of the technology described herein;

FIG. 3 is a front planar view of the metered water wall mounted dispensing system depicted in FIG. 1, illustrating, in particular, a water reservoir, dispensing actuator, dispensing cup cover, locking lid, wall mount, and dispensing port, according to an embodiment of the technology described herein;

FIG. 4 is a right side view of the metered water wall mounted dispensing system depicted in FIG. 1 illustrating, in particular, the movement area for the back-and-forth motion of the dispensing actuator, according to an embodiment of the technology described herein;

FIG. 5 is a back view of the metered water wall mounted dispensing system depicted in FIG. 1, illustrating, in particular, mounting holes, according to an embodiment of the technology described herein;

FIG. 6 is a top view of the metered water wall mounted dispensing system depicted in FIG. 1, illustrating, in particular, the locking lid and a key by which the locking lid is locked and unlocked, according to an embodiment of the technology described herein;

FIG. 7 is a right side detail view of the water wall mounted dispensing system depicted in FIG. 1, illustrating, in particular, a phantom cup cover in order to show the actuator detail, a dispense cup, designed to hold a predetermined amount of water separate from the water reservoir and ready for dispense, and to show the actuator in a fill position and a dispense cup spring, and to show the actuator in a non-actuated position, according to an embodiment of the technology described herein;

FIG. 8 is a right side detail view of the water wall mounted dispensing system depicted in FIG. 1, illustrating, in particular, a phantom cup cover in order to show the actuator detail, a dispense cup, designed to hold a predetermined amount of water separate from the water reservoir and ready for dispense, and to show the actuator in a fill position and a dispense cup spring and to show the actuator in a dispense position, according to an embodiment of the technology described herein;

FIG. 16 is a top perspective view of a metered water wall mounted dispensing system, illustrating, in particular, a water reservoir, dispensing actuator, dispensing cup cover, locking lid, and wall mount, according to an alternate, wide embodiment of the technology described herein;

FIG. 17 is a bottom perspective view of the metered water wall mounted dispensing system depicted in FIG. 16, illustrating, in particular, a dispensing port, according to an embodiment of the technology described herein;

FIG. 18 is a front perspective view of the metered water wall mounted dispensing system depicted in FIG. 16;

FIG. 19 is a right side view of the metered water wall mounted dispensing system depicted in FIG. 16; and FIG. 20 is a back view of the metered water wall mounted dispensing system depicted in FIG. 16.

DETAILED DESCRIPTION OF THE INVENTION

Figure 9:
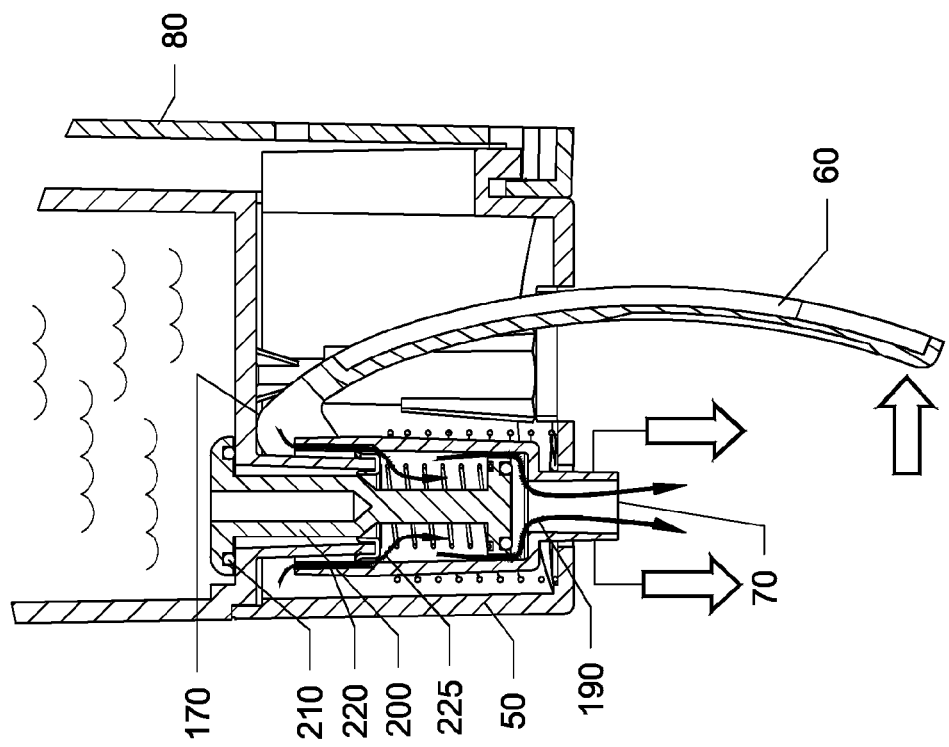
FIG. 9 is a right, side cross-sectional (from the lines shown in FIG. 3) detail view of the water wall mounted dispensing system depicted in FIG. 1, illustrating, in particular, to show the actuator detail, to show the actuator in a fill position, and to show the dispense valve open to the reservoir allowing the dispense cup to fill with a predetermined fluid volume while shutting off the dispense port, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and method for dispensing water to moisten and soften toilet paper tissue, thereby to create an adhesive wipe and to provide a thorough surface cleaning.

Referring now to the Figures, a metered water wall mounted dispensing system 10 is shown. The system 10 depicted in FIGS. 1 through 15 depicted a narrow embodiment. The system 250 depicted in FIGS. 16 through 20 depicted a wide embodiment. As will be apparent to a reader upon reading this disclosure, the dispenser system 10 can be manufactured and utilized in varying sizes and configurations dependent on various preferences and needs.

The system 10 includes a water reservoir 20. The water reservoir 20 is configured to hold water 190. Water 190 is utilized as the cleansing agent. Water 190 preferably is utilized in the water reservoir 20. Water 190 is the preferable solution to utilize as it does not introduce other compounds that may produce allergic reactions to a sensitive body area when applied to the user. For additional prevention, purified, distilled water 190 is utilized in at least one embodiment to further lessen chances under which the solution may create irritation once applied.

The system 10 includes a water reservoir locking lid 30. The water reservoir locking lid 30 is configured for placement directly upon the top of the water reservoir 20. The water reservoir locking lid 30 is lockable, such that it can be secured to the water reservoir 20 once it is filled and thereby to prevent any unwanted tampering with the cleansing agent, or water 190, placed within the water reservoir 20.

Figure 13:
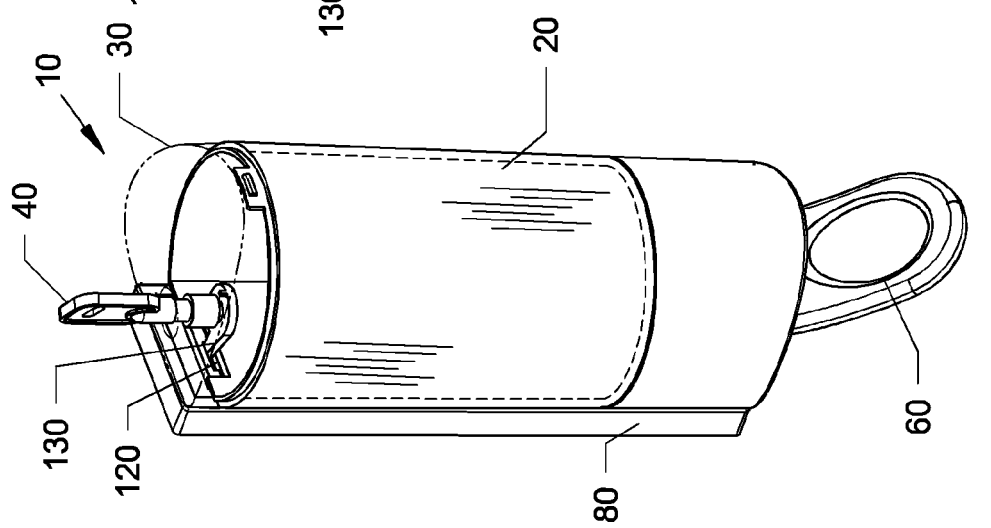
FIG. 13 is a top perspective view of the water wall mounted dispensing system depicted in FIG. 1, illustrating, in particular, the reservoir lid shown in phantom detail to show the lock detail and showing the key removed from the lid and in which state the lid is free to be removed, according to an embodiment of the technology described herein.

The system 10 includes a locking lid key 40. The locking lid key 40 is configured for use with the water reservoir locking lid 30 and to lock the water reservoir locking lid 30 securely to the water reservoir 20. As shown in FIG. 13, for example, the locking lid key 40 can be removed once the water reservoir locking lid 30 is locked and secured.

The system 10 includes a dispense cup cover 50. The dispense cup cover 50 is coupled to the bottom side of the water reservoir 20 with pins 55 in at least one embodiment. Alternative means to couple the dispense cup cover 50 to the bottom side of the water reservoir 20 can be used in alternate embodiments. The dispense cup cover 50 is configured to cover the dispense cup 140, discussed in more detail below.

The system 10 includes a dispensing actuator 60. The dispensing actuator 60 is coupled to the underside of the water reservoir 20, along with other components discussed below, and is configured to be user-operable to dispense water 190 from the system 10 when desired for use and improved personal hygiene.

The system 10 includes a dispensing port 70. The dispensing port 70 is disposed on the bottom side of the system 10. The dispensing port 70 is configured to discharge the water 190, which is a measured, predetermined volume of water, upon the selection by the user and depression of the dispensing actuator 60. The dispensing actuator 60 is pressing toward the wall surface onto which the system is mounted. Once the water 190 is discharged from the system 10, the user releases the dispensing actuator 60 to return to its default position.

The system 10 includes a wall mount plate 80. Wall mount 80 is configured to couple the system 10 to a wall surface, such as for example, a wall surface in a bathroom conveniently located for personal hygiene use. As depicted specifically in FIG. 14, the system 10 and wall mount plate 80 are showing separated, but with dashed lines illustrating how a user can couple mechanically the dispenser system 10 to the wall mounting plate 80 once it is mounted to a wall surface. FIG. 1, for example, illustrates the dispenser system 10 already coupled to the wall mounting plate 80.

The system 10 includes holes 90 disposed within the wall mount plate 80 for wall mount screws, or like fastening devices. As depicted, for example, in FIG. 14, the holes 90 provide a means through which mounting screws, fasteners, and so forth can be utilized to secure the wall mounting plate 80 to a planar wall surface.

Figure 14:
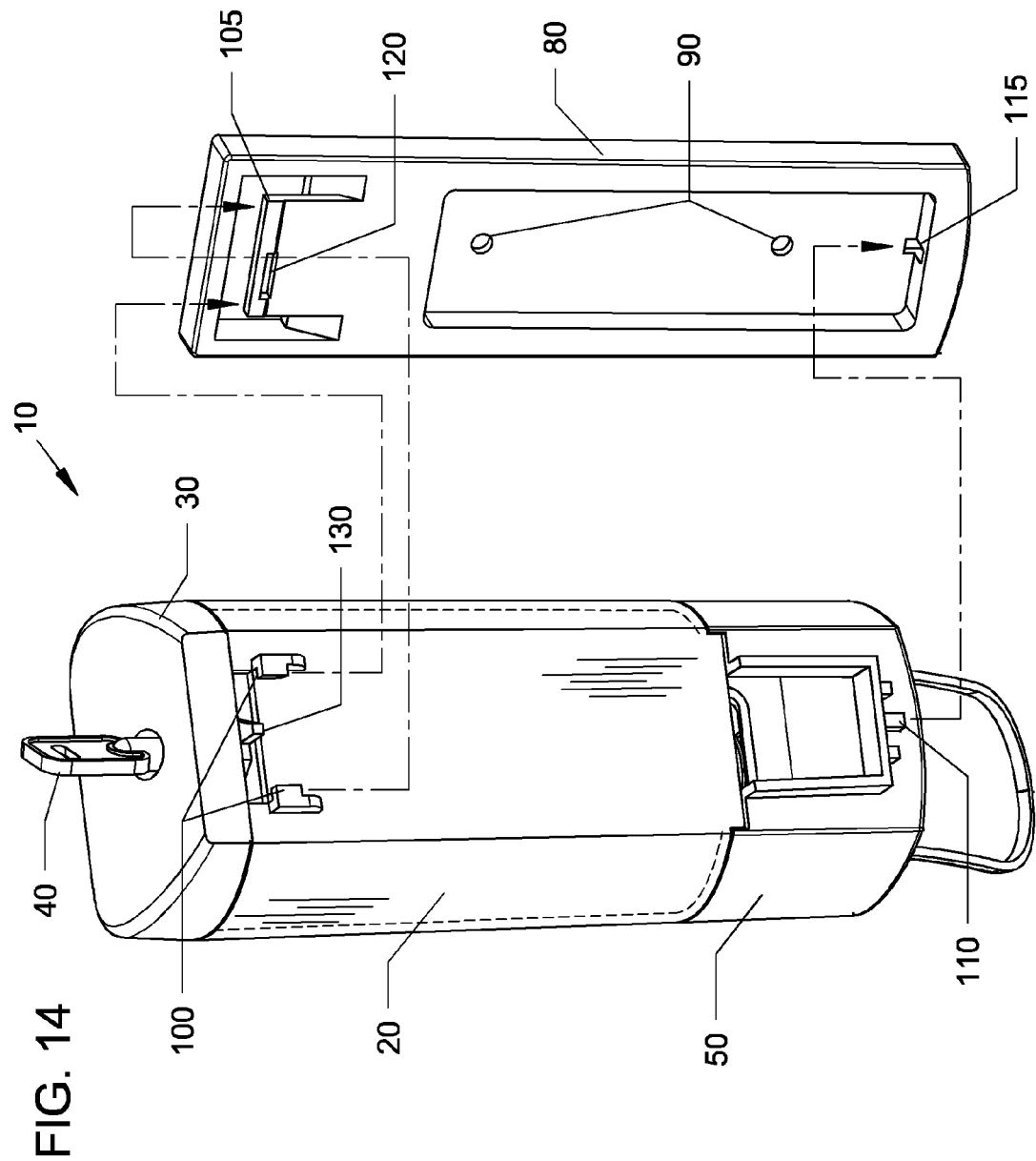
FIG. 14 is a rear perspective view of the metered water wall mounted dispensing system depicted in FIG. 1, illustrating, in particular, the wall mount plate removed and rotated to illustrate the mounting geometry detail, according to an embodiment of the technology described herein.

The dispenser system 10 includes a pair of top mounting hooks 100. The top mounting hooks 100 are best depicted in FIG. 14. The top mounting hooks 100 are disposed on the back side of the water reservoir 20. The top mounting hooks 100 are configured to engage a tongue 105, which is disposed on the wall mounting plate 80. This coupling provides for a secure attachment of the water reservoir 20 to the wall mounting plate 80.

The system 10 includes a bottom mounting post 110. The bottom mounting post 110 is best depicted in FIG. 14. The bottom mounting post 110 is disposed on the metering dispense cup cover 50. The bottom mounting post 110 is configured to engage a hole 115 in the wall mounting plate 80. The hole 115 in the wall mounting plate 80 is configured to receive the bottom mounting post 110 to create a secure hold. This coupling provides for a secure attachment of the water reservoir 20 to the wall mounting plate 80.

The dispenser system 10 includes a lid lock catch 120. The lid lock catch 120 is best depicted in the expanded view of FIG. 14. The lid lock catch 120 is disposed on the wall mounting plate 80 and is configured to receive a portion of the rotating lid lock catch 130, discussed immediately below.

Figure 11:
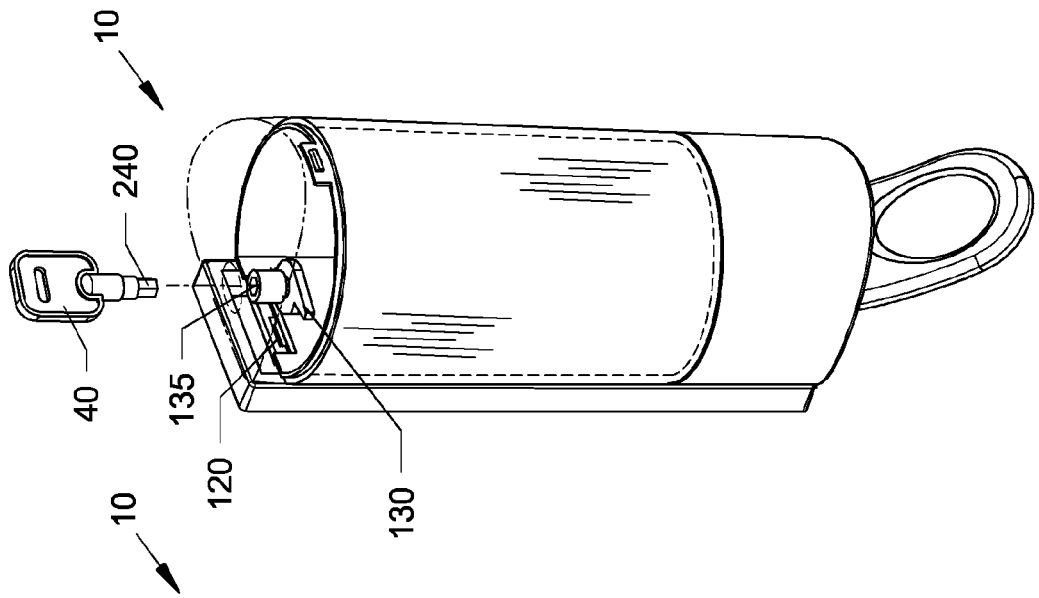
FIG. 11 is a top perspective view of the water wall mounted dispensing system depicted in FIG. 1, illustrating, in particular, the reservoir lid, shown in phantom detail to show the lock detail, and with the lid in a locked position, according to an embodiment of the technology described herein.
Figure 12:
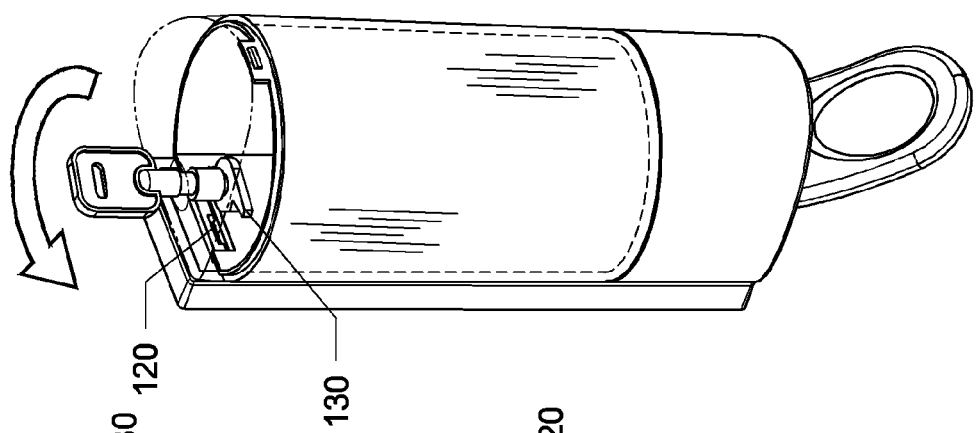
FIG. 12 is a top perspective view of the water wall mounted dispensing system depicted in FIG. 1, illustrating, in particular, the reservoir lid shown in phantom detail to show the lock detail and showing the lock in a turned position and the lid unlocked, according to an embodiment of the technology described herein.
Figure 15:
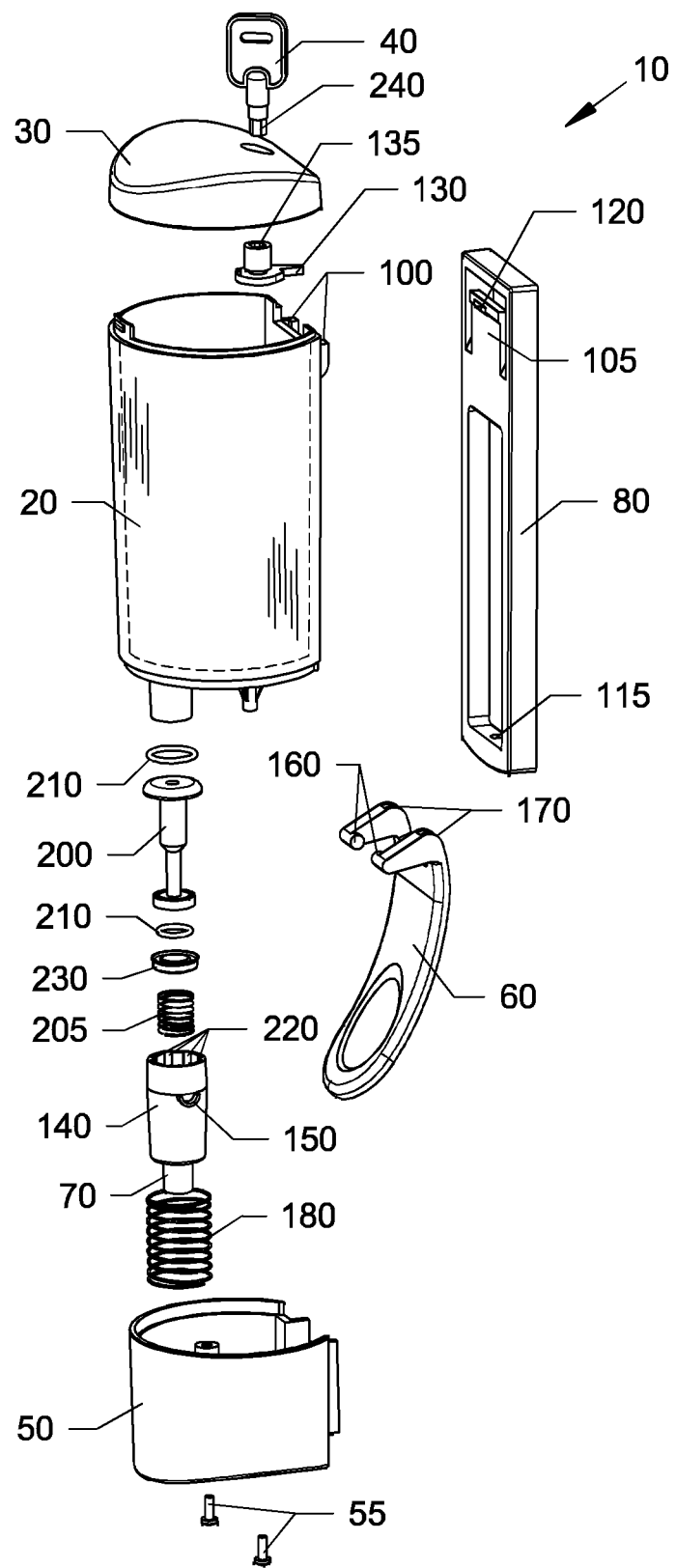
FIG. 15 is an exploded view of the metered water wall mounted dispensing system depicted in FIG. 1, illustrating, in particular, the various subcomponents of the device and a means of assembly, according to an embodiment of the technology described herein.

The system 10 includes a rotating lid lock catch 130. The rotating lid lock catch 130 is best depicted in FIG. 15, the expanded view, in which the shape of the rotating lid lock catch 130 is seen. The rotating lid lock catch 130 is configured to engage the lid lock catch 120 on the wall mounting plate 80. The rotating lid lock catch 130 includes a projection at one end which enters the lid lock catch 120 upon user rotation of the locking lid key 40. As such the water reservoir locking lid 30 is locking to the water reservoir 20. FIGS. 11, 12, and 13, respectively, illustrate the insertion of the locking lid key 40, the turning/rotation of the locking lid key 40, and the withdrawal of the locking lid key 40 from the water reservoir locking lid 30.

The dispenser system 10 includes a dispense cup 140. The dispense cup 140 is best depicted in FIG. 15, the expanded view, in which the shape of the dispense cup 140 and its relationship adjacent to other system 10 components is illustrated. The dispense cup 140 is disposed immediately below the water reservoir 20. The dispense cup 140 is configured to hold a predetermined volume of water. In various embodiments, the dispense cup 140 can be varied to change the predetermined volume of water.

The system 10 includes dispense cup posts nests 150. The dispense cup posts nests 150 are best depicted in FIG. 15, the expanded view, in which the shape of the dispense cup posts nests 150 and their relationship adjacent to other system 10 components is illustrated. The dispense actuator posts 160 (described in more detail immediately below) on the dispensing actuator 60 rest within the dispense cup posts nests 150.

The system 10 includes dispense actuator posts 160. The dispense actuator posts 160 are best depicted in FIG. 15, the expanded view, in which the shape of the dispense actuator posts 160 and their relationship adjacent to other system 10 components is illustrated. The dispense actuator posts 160 are configured to engage the nests in the dispense cup 140. For example, as depicted in FIGS. 7 and 8, respectively, the dispensing actuator 60 is shown in a relaxed position and a depressed position, pivoting about the dispense actuator posts 160.

The system 10 includes a dispense actuator rocking fulcrum 170. The dispense actuator rocking fulcrum 170 is best depicted in FIG. 15, the expanded view, in which the shape of the dispense actuator rocking fulcrum 170 and its relationship adjacent to other system 10 components is illustrated. The dispense actuator rocking fulcrum 170 provides contact points between the actuator 60 and a bottom surface of the water reservoir 20. The dispense actuator rocking fulcrum 170 is configured to push downwardly via the dispense cup post nests 150 when the actuator 60 is push toward the back of the dispensing system 10, as depicted in FIG. 8, for example.

The system 10 includes a dispense cup spring 180. The dispense cup spring 180 is best depicted in operation (at rest and extended) in FIGS. 7 and 8, respectively. The dispense cup spring 180 is configured to return the dispense cup 140 to a default up position when the dispensing actuator 60 is released. FIG. 8 depicts the dispensing actuator 60 depressed and the dispense cup spring 180 depressed. As the dispensing actuator 60 is released, the dispense cup spring 180 returns the dispense cup 140 as depicted in FIG. 7.

The system 10 includes a dispensing valve 200. The dispensing valve 200 is best depicted in FIG. 15, the expanded view, in which the shape of the dispensing valve 200 and its relationship adjacent to other system 10 components is illustrated. The dispensing valve 200, when in the cup-up position (fill), is configured to allow the dispense cup 140 to fill with the metered amount of water 190. While doing so the dispensing valve 200 shuts off the dispenser port 70. The dispensing valve 200, when in the cup-down position (dispense), is configured to shut off the water reservoir 20 while allowing the dispense cup 140 to drain.

The system 10 includes a dispensing valve spring 205. The dispensing valve spring 205 is best depicted in FIG. 15, the expanded view, in which the shape of the dispensing valve spring 205 and its relationship adjacent to other system 10 components is illustrated. The dispensing valve spring 205 seats the dispensing valve 200 in the water reservoir 20 when the dispense cup 140 is in the dispense position shutting off the water reservoir 20.

Figure 10:
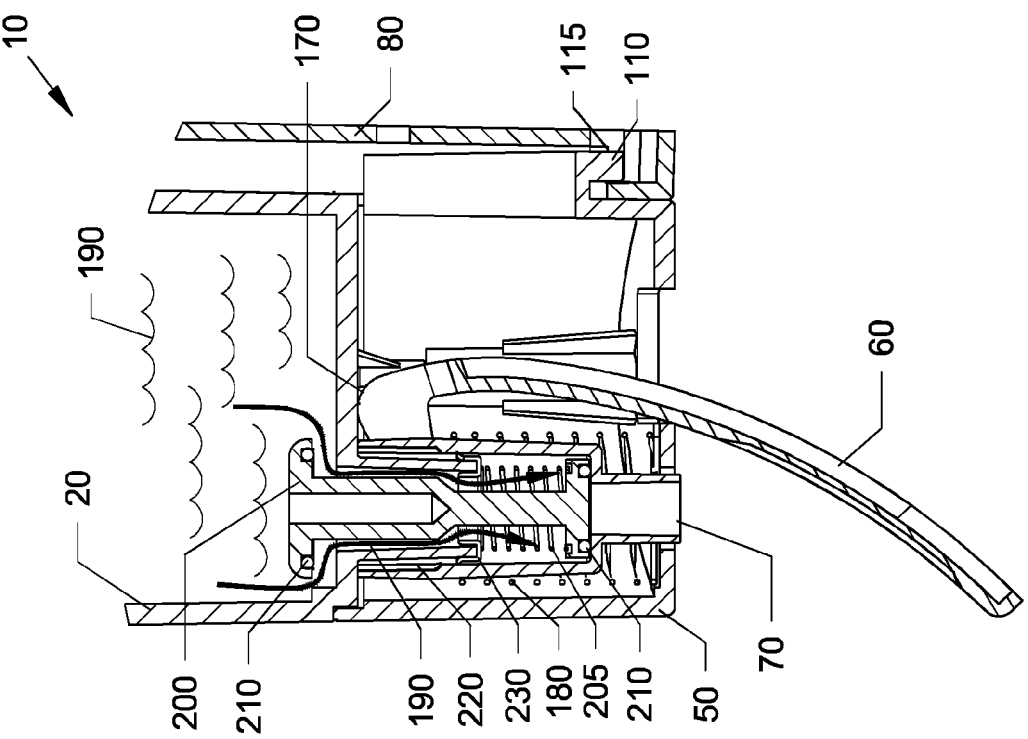
FIG. 10 is a right side, cross-sectional (from the lines shown in FIG. 3) detail view of the water wall mounted dispensing system depicted in FIG. 1, illustrating, in particular, to show the actuator detail, to show the actuator in a fill position, and to show the dispense valve open to the reservoir allowing the dispense cup to fill with a predetermined fluid volume while shutting off the dispense port and with the actuator in a dispense position showing the actuator valve shutting off the reservoir while opening the dispense port, according to an embodiment of the technology described herein.

The system 10 includes O-ring seals 210. The O-ring seals 210 are best depicted in FIG. 15, the expanded view, in which the shape of the O-ring seals 210 and their relationship adjacent to other system 10 components is illustrated. Additionally, cross-sectional views of the O-ring seals 210 are illustrated in FIGS. 9 and 10. The O-ring seals 210 are configured to provide a seal between components of the system 10. By way of example, O-rings seals 210 are utilized on the dispense valve 200 to provide a seal between the dispense valve 200 and the water reservoir 20. By way of example, O-rings seals 210 are utilized between the dispense valve 200 and the dispense cup 140.

The system 10 includes axial air vent grooves 220. The axial air vent grooves 220 are disposed within the dispense cup 140, as best depicted in FIGS. 9 and 10 showing vented air 225 path. The axial air vent grooves 220 are opened when the dispense cup 140 is in the dispense position to allow air to vent into the dispense cup 140 while water 190 is being dispensing, thereby preventing vapor lock. By way of example, and as depicted specifically in FIG. 10, vented air 225 is shown flowing into the dispense cup 140.

The system 10 includes a dispense cup seal 230. The dispense cup seal 230 is best depicted in FIG. 15, the expanded view, in which the shape of the dispense cup seal 230 and its relationship adjacent to other system 10 components is illustrated. The dispense cup seal 230 is configured to keep fluid in the dispense cup 140 from overflowing during the water fill stage. The dispense cup seal 230 also is configured to open the axial air vent grooves 220 when in the dispense position.

The system 10 includes hex post 240 disposed on the locking lid key 40. The water reservoir locking lid 30 is configured with a hex cavity 135. The hex cavity 135 is disposed within the water reservoir locking lid 30 and coupled to the rotating lid lock latch 130.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology disclosed herein and are intended to be covered by the following claims.

What is claimed is:

1. A metered, wall-mounted liquid dispenser, for use in improved personal hygiene, comprising:
   a water reservoir configured to hold water for use in a metered dispense once actuated by a user for dispense;
   a water reservoir locking lid and key, wherein the locking lid is configured for secure placement atop the water reservoir and wherein the key is configured to selectively lock and unlock the locking lid;
   a dispense cup disposed within the liquid dispenser immediately below the water reservoir and fluidly coupled to the water reservoir and configured to hold a predetermined volume of the water received from the water reservoir to use for each metered release of the water from the liquid dispenser once actuated by the user for dispense;
   a dispensing valve disposed between the water reservoir and the dispense cup and configured, when in a cup-up position to allow the dispense cup to fill with the water, thereby configured to also shut off the water flow from the dispenser, and configured, when in a cup-down position, to shut off the water reservoir while allowing the dispense cup to drain; and
   a dispense cup spring disposed cylindrically around a perimeter of the dispense cup and configured to return the dispense cup to a default up position when actuation of the dispenser ceases.

2. The metered, wall-mounted liquid dispenser of claim 1, further comprising:
   a dispensing actuator disposed below the water reservoir and mechanically coupled to the dispense cup and configured to be user-operable, with one-handed operation, to dispense the water in the predetermined volume of the water from the dispense cup as the user pushes the dispensing actuator, thereby to actuate release of the water within the dispense cup, and wherein the dispensing actuator automatically returns to a position after actuation by the user.

3. The metered, wall-mounted liquid dispenser of claim 2, further comprising:
   a dispensing actuator rocking fulcrum disposed upon a top portion of the dispensing actuator and configured to provide a plurality of contact points between the dispensing actuator and a bottom surface of the water reservoir over which the dispensing actuator can rock back and forth in movement as actuated by the user.

4. The metered, wall-mounted liquid dispenser of claim 1, further comprising:
   a dispensing port disposed below, and fluidly coupled to, the dispense cup and configured to discharge the predetermined volume of the water from the dispense cup and below which the user places a receiving tissue to thereby moisten the tissue for use in improved personal hygiene.

5. The metered, wall-mounted liquid dispenser of claim 1, further comprising:
   a dispensing valve spring disposed cylindrically around a perimeter of the dispensing valve and configured to seat the dispensing valve in the water reservoir when the dispense cup is in the cup-down position shutting off the water reservoir and to unseat the dispensing valve in the water reservoir when in the cup-up position to again fill the dispense cup for a subsequent use by the user.

6. The metered, wall-mounted liquid dispenser of claim 1, further comprising:
   a pair of O-ring seals, a first O-ring seal disposed between the dispense valve and the water reservoir, thereby configured to provide a first seal between the dispense valve and the water reservoir to prevent the water flow and seepage, and a second O-ring seal disposed between the dispense valve and the dispense cup, thereby configured to provide a second seal between the dispense valve and the dispense cup to prevent the water flow and seepage.

7. The metered, wall-mounted liquid dispenser of claim 1, further comprising:
   a plurality of axial air vent grooves disposed within the dispense cup and thereby configured to provide a vented air path such that the axial air vent grooves are opened when the dispense cup is in the dispense position to allow air to vent into the dispense cup while the water is being dispensing, also thereby configured to prevent vapor lock.

8. The metered, wall-mounted liquid dispenser of claim 7, further comprising:
a dispense cup seal disposed within the dispense cup and configured to keep the water in the dispense cup from overflowing during a water fill stage and avoid water seepage, and configured to open the axial air vent grooves when in the dispense position.

9. The metered, wall-mounted liquid dispenser of claim 1, further comprising:
a dispense cup cover coupled to a bottom side of the water reservoir and configured to cover the dispense cup.

10. The metered, wall-mounted liquid dispenser of claim 1, further comprising:
a wall mount plate configured to couple the metered, wall-mounted liquid dispenser to a wall surface, and thereby further configured to aid in the one-handed user operation of the liquid dispenser.

11. The metered, wall-mounted liquid dispenser of claim 10, further comprising:
a plurality of holes disposed within the wall mount plate and configured as a means through which mounting screws and fasteners are utilized to secure the wall mounting plate to the wall surface.

12. The metered, wall-mounted liquid dispenser of claim 10, further comprising:
a pair of top mounting hooks disposed on a back side of the water reservoir and configured to engage a tongue, which is disposed on the wall mounting plate, thereby to provide a secure attachment of the water reservoir to the wall mounting plate.

13. The metered, wall-mounted liquid dispenser of claim 10, further comprising:
a bottom mounting post disposed on a metering dispense cup cover and configured to engage a hole in the wall mount plate and configured to receive the bottom mounting post to create a secure hold, thereby to provide secure attachment of the water reservoir to the wall mounting plate.

14. The metered, wall-mounted liquid dispenser of claim 1, further comprising:
at least one aeration hole disposed upon a top surface of the water reservoir locking lid and thereby configured to allow an airflow ingress and egress with the water reservoir and thereby provide aeration to the water within the water reservoir.

15. The metered, wall-mounted liquid dispenser of claim 1, further comprising:
an aeration screen disposed upon a top surface of the water reservoir locking lid and thereby configured to allow an airflow ingress and egress with the water reservoir and thereby provide aeration to the water within the water reservoir.

16. The metered, wall-mounted liquid dispenser of claim 1, further comprising:
a hex post disposed upon the locking lid key;
wherein the water reservoir locking lid is configured with a hex cavity and configured to receive the locking lid key having the hex post.

17. The metered, wall-mounted liquid dispenser of claim 1, further comprising:
a plurality of dispense actuator posts disposed upon the dispense cup and configured to receive a dispensing actuator and provide a pivot point about which the dispensing actuator pivots.

18. The metered, wall-mounted liquid dispenser of claim 1, wherein the liquid dispenser is configured for single handed operation.

* * * * *